(No Model.)
L. D. BALL.
COMBINATION TOOL.
No. 561,957. Patented June 16, 1896.
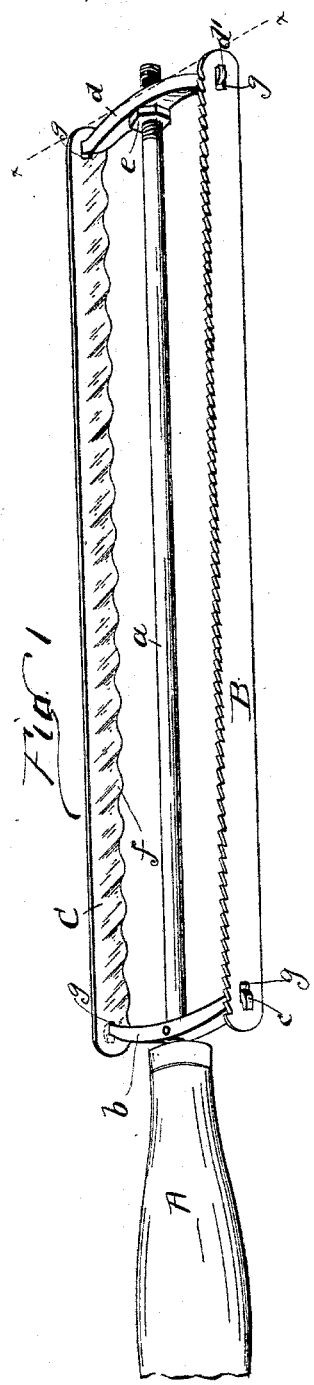
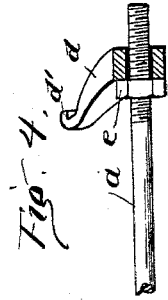
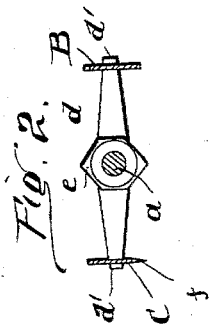
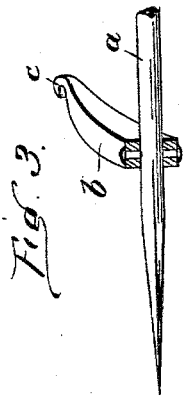
WITNESSES
C. J. Sross.
Bertha Finch.
INVENTOR
Lorenzo D. Ball
By Fred W. Bond
Attorney

UNITED STATES PATENT OFFICE.

LORENZO D. BALL, OF CANTON, OHIO.

COMBINATION-TOOL.

SPECIFICATION forming part of Letters Patent No. 561,957, dated June 16, 1896.

Application filed March 13, 1896. Serial No. 583,010. (No model.)

*To all whom it may concern:*

Be it known that I, LORENZO D. BALL, a citizen of the United States, residing at Canton, in the county of Stark and State of Ohio, have invented certain new and useful Improvements in Combination-Tools; and I do hereby declare that the following is a full, clear, and exact description of the same, reference being had to the annexed drawings, making part of this specification, and to the letters of reference marked thereon, in which—

Figure 1 is a perspective view showing the different parts properly connected. Fig. 2 is a cross-section through line $xx$, Fig. 1. Fig. 3 is a view showing a portion of the inner cross-bar and illustrating the same attached to the shank or bar. Fig. 4 is a view showing the outer cross bar or arm and illustrating the same connected to the outer end of the shank or bar. Fig. 5 is a view showing a portion of one of the blades and illustrating the aperture for attaching the blade to the cross bar or arm.

The present invention has relation to a combined tool; and it consists in the different parts and combination of parts hereinafter described, and particularly pointed out in the claim.

Similar letters of reference indicate corresponding parts in all the figures of the drawings.

In the accompanying drawings, A represents the handle, which may be constructed in the ordinary manner, to which handle is attached in any convenient and well-known manner the shank or bar $a$, which shank or bar is formed of a length to correspond substantially with the length of the tool designed to be constructed. To the inner or handle end of the shank or bar $a$ is securely attached in any convenient and well-known manner the cross bar or arm $b$, the ends of said cross-bar being provided with the hooks $c$, which hooks are for the purpose hereinafter described. To the outer end of the shank or bar $a$ is adjustably attached the cross bar or arm $d$, which cross bar or arm is provided with the hooks $d'$. The outer end of the shank or bar $a$ is screw-threaded for a short distance, upon which screw-threaded portion is located the nut $e$, said nut being located upon the inner side of the cross bar or arm $d$. To the outer ends of the cross-bars $b$ and $d$ and upon the hooked ends thereof are attached the blades B and C, said blades being located and arranged as illustrated in Fig. 1.

The blade B is provided with saw-teeth upon one of its edges and is especially designed as a meat-saw. The blade C is corrugated, which corrugations extend through a portion of the width of the blade, said corrugations terminating in the teeth $f$.

The blade C is especially designed for a bread-knife or like use.

For the purpose of tightening the blades B and C after they have been properly attached to the cross bars or arms the nut $e$ is rotated so as to force the cross bar or arm $d$ outward and away from the cross bar or arm $b$, thereby giving the blades C and B the desired amount of tension.

It will be understood that by connecting the ends of the blades B and C and holding said blades at a tension thin blades can be used without danger of the blades springing or bending out of position. Each of the blades B and C is provided with apertures, such as $g$, which apertures are for the purpose of connecting the blades to the cross bars or arms.

For the purpose of bringing the cutting edge of the right-hand blade down, or, in other words, bringing the right-hand blade in proper position for use, the cutting edges of the blades are reversed, one being up and the other down.

It will be understood that the shank or bar $a$ will act as a guide for the blades, thereby gaging the thickness of the slices of bread or meat to be cut.

It will be understood that by providing the adjustable cross bar or arm $d$ the blades B and C can be easily detached for the purpose of filing or sharpening, and at the same time new blades can be substituted for old ones without any increased cost, except the cost of the new blade.

Having fully described my invention, what I claim as new, and desire to secure by Letters Patent, is—

The combination of the handle A, provided with the shank or bar *a*, having a fixed cross bar or arm connected to the bar *a*, and an adjustable cross bar or arm located upon the bar *a*, the blades B, and C, connected to the cross-arms and the cutting edges of said blades reversed, substantially as and for the purpose specified.

In testimony that I claim the above I have hereunto subscribed my name in the presence of two witnesses.

LORENZO D. BALL.

Witnesses:
J. A. JEFFERS,
F. W. BOND.